United States Patent [19]
Leonard et al.

[11] Patent Number: 4,885,652
[45] Date of Patent: Dec. 5, 1989

[54] DISK CARTRIDGE

[75] Inventors: Vurnen J. Leonard, Minneapolis, Minn.; Masayuki Kuroda, Yokohama, Japan

[73] Assignees: Minnesota Mining and Manufacturing Company, St. Paul, Minn.; Sony Corporation, Tokyo, Japan

[21] Appl. No.: 217,442

[22] Filed: Jul. 11, 1988

[51] Int. Cl.⁴ .............................................. G11B 23/03
[52] U.S. Cl. ................................... 360/133; 360/97.02
[58] Field of Search .................. 360/97.02, 97.04, 133

[56] References Cited
U.S. PATENT DOCUMENTS 4,359,762 11/1982 Stollorz ........................... 360/133 X
4,459,628 7/1984 Barton ................................ 360/133
4,636,891 1/1987 Barski .............................. 360/97.02

Primary Examiner—A. J. Heinz
Attorney, Agent, or Firm—Donald M. Sell; Walter N. Kirn; David W. Anderson

[57] ABSTRACT

A generally square disk cartridge for a recording disk includes at least one air filter in a corner of the cartridge and a circular rib adjacent the disk and between the disk and the filter. The cartridge may also include a radial rib connected to the circular rib to enhance air flow to the filter. Air filters may be located in each of the corners of the cartridge with associated circular and radial ribs to induce air flow to each.

6 Claims, 2 Drawing Sheets 4,885,652

DISK CARTRIDGE

BACKGROUND OF THE INVENTION

1. Field of the Invention

This invention relates to disk cartridges which contain a recording/playback disk which is contained in such a way that the disk is free to rotate.

2. Description of the Prior Art

A disk cartridge which contains a recording/playback disk contained in such a way in the cartridge that the disk is free to rotate, and recording and playback are accomplished by inserting a head into the cartridge while rotating the disk at high speed within the cartridge, is disclosed in U.S. Pat. No. 4,459,628.

However, in the above-mentioned patent, no form of dust prevention in the cartridge has been provided, and therefore, when a disk is rotated at high speed (for example 3600 rpm), air flow induced by the rotation causes dust in the cartridge to become disturbed, some of which becomes trapped between the disk and the head, which leads to problems such as dropouts and damage to the disk and head.

SUMMARY OF THE INVENTION

In the disk cartridge of the present invention, an air filter is provided near the outer circumference of the cartridge, and ribs, which induce the air in the cartridge to flow toward the air filters, are incorporated into the inner surface of the cartridge.

When the disk is rotated at high speed within the cartridge, airflow induced by the rotation of the disk is directed toward the air filters by the ribs, and dust contained in the air is effectively removed by the air filters.

BRIEF DESCRIPTION OF THE DRAWINGS

The novel features and advantages of the present invention will become more apparent to those skilled in the art upon consideration of the following detailed description which refers to the accompanying drawings, wherein.

DESCRIPTION OF THE PREFERRED EMBODIMENT

Figure 1:
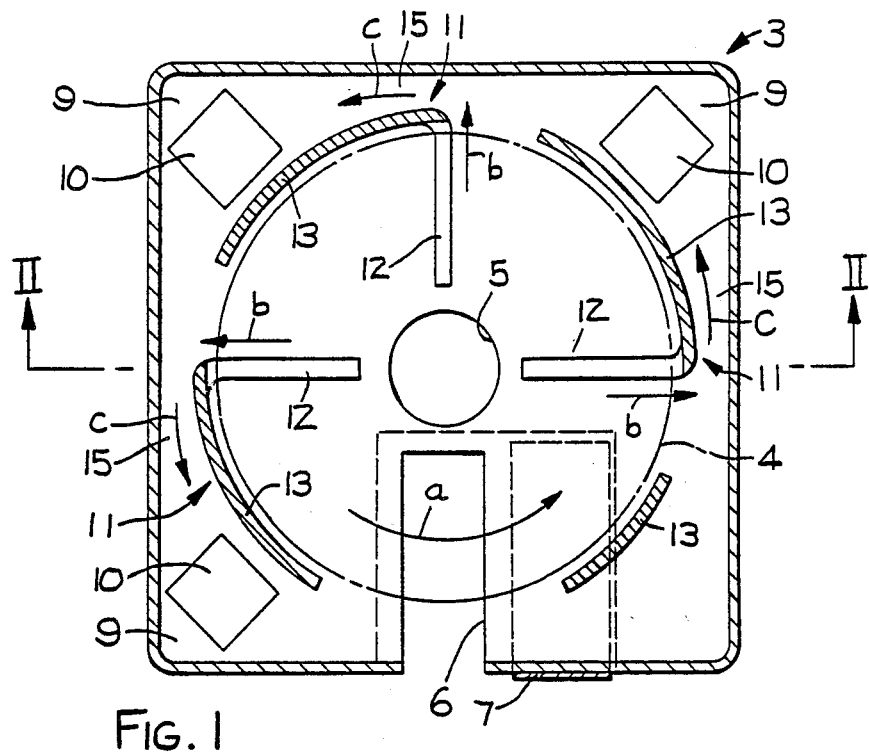
FIG. 1 is a cross-sectional plan view of one embodiment of a cartridge of the present invention taken generally along the line I—I of FIG. 2.
Figures 2, 4, 5:
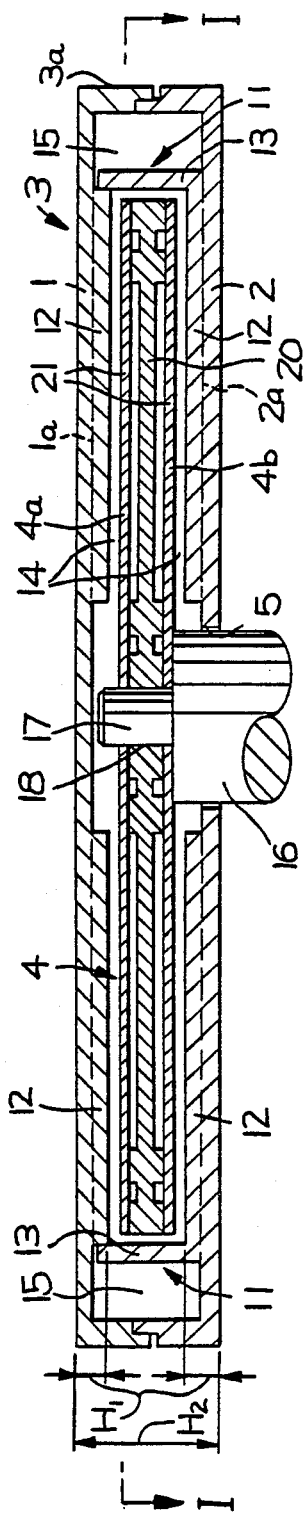
FIG. 2 is a cross-sectional elevational view of the cartridge of FIG. 1 taken generally belong the line II-II of FIG. 1.
FIGS. 4 and 5 are partial and enlarged cross-sectional views of recording disks which may be contained within the cartridge of the present invention.

As shown in FIGS. 1 and 2, cartridge 3 consists 6 of upper and lower halves (1 and 2) made of a synthetic resin, and a recording/playback disk 4 which is contained in cartridge 3 in such a way that the disk is free to rotate. A turntable insertion hole 5 is provided at the center of the lower half 2 of the cartridge, and a pair of head insertion slots 6, formed in the upper and lower halves 1 and 2, are designed to be closed by a U-shaped shutter 7.

Three air filters 10 are provided at the three corners 9, which are near the outer circumference of disk 4 in cartridge 3. Three pairs of ribs 11, which direct the airflow within the cartridge toward the air filters 10, are incorporated into the inner surface of cartridge 3. These ribs 11 consist of radial ribs 12, which stretch from the turntable insertion hole toward the outer circumference of the disk 4, and circular ribs 13, which stretch from the outer ends of the radial ribs 12 along the outer circumference of the disk 4 (disk rotation is in the direction of arrow a), and are incorporated into the upper and lower halves 1 and 2 and 1a and 2a. Radial ribs 12 are formed at a height of $H_1$ to provide a space 14 between the upper 4a and the lower 4b surfaces of disk 4 and the cartridge 3, and circular ribs 13 are formed at a height of $H_2$ to connect the inner surfaces 1a and 2a of the cartridge 3.

Space 15, which leads to the before mentioned corners 9, is formed between the circular rib 13 and the outer wall 3a of cartridge 3. When the disk cartridge is inserted into the disk player (not shown), spindle 17 of turntable 16 is inserted through turntable hole 5 into the spindle insertion hole 18 in the center of disk 4, and as disk 4 is chucked on turntable 16, shutter 7 opens and a pair of recording/playback heads (not shown) are positioned on the upper 4a and lower 4b surfaces of the disk 4. Then, disk 4 is rotated at a high speed (for example 3600 rpm) in the direction of arrow a by turntable 16, and recording/playback of disk 4 is carried out within cartridge 3.

At this time, airflow is induced in cartridge 3 by the high speed rotation of disk 4, and air is guided in the direction of the arrows b and c by ribs 11 and directed through air filters 10. Dust contained in the air is effectively removed by the air filters 10, which prevents trapping of dust between the upper and lower surfaces (recording surfaces) 4a and 4b of disk 4 and the heads in the cartridge.

Also, rectification of air flow is accomplished, which prevents head oscillation and provides a uniform heat distribution for the upper and lower surfaces 4a and 4b of disk 4 by directing airflow in the cartridge by means of ribs 11.

Figure 3:
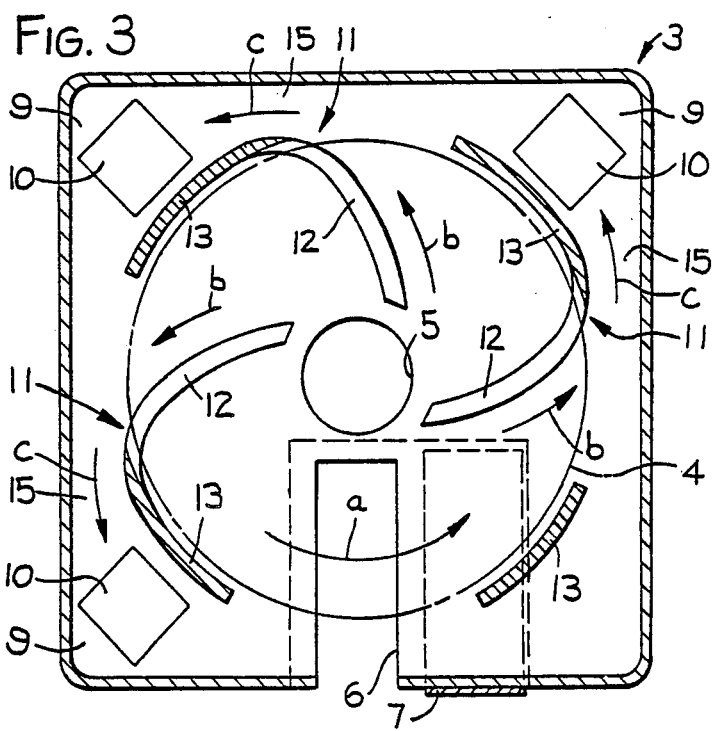
FIG. 3 is a cross-sectional plan view illustrating a second embodiment of the present invention shown in a manner similar of FIG. 1.

FIG. 3 shows a variation of rib 11. Radial rib 12 forms a smooth circular curve starting at the center circumference of turntable insertion hole 5 and spreading toward the outer circumference of disk 4 to form a smooth curve in the direction of disk rotation (arrow a direction).

In the case of the above-mentioned example, air current induction in the direction of arrow b is found to be improved, and the airflow into air filter 10 increases, and as a result, the degree of rectification of air current is increased.

While the ribs 12 shown in FIGS. 1 and 3 are preferable, it has also been found that the ribs 12 can be eliminated completely if the circular ribs 13 are retained. Air flow is generated by the rotating disk 4 which will be forced through the spaces between the ribs 13 and to the filters 10.

It should be noted that disk 4 used in the above-mentioned practical example is made by laminating a sheet comprised of a synthetic resin film, with a magnetic coating on both sides of a disk 4 made of materials such as synthetic resins or light metals under tension.

That is, in the case of the structure shown in FIG. 4, the base support surfaces 22a and 22b, and false support surfaces 23a and 23b are provided on both sides of the inner and outer circumferences 20a–20b of disk substrate 20, and grooves 24a–24b are formed between them. A pair of sheets 21a–21b are applied to false surfaces 23a and 23b with an adhesive.

In the case of the structure shown in FIG. 5, a neck G is provided on 23a and 23b for the base surfaces 22a and 22b and false surfaces 23a and 23b are parallel with the base surface 22a and 22b. A pair of sheets 21 are applied in the same manner as in FIG. 4.

Ring grooves 24a and 24b provide a clearance groove for adhesives thus maintaining the flatness of sheet 21.

Practical examples of this model were mentioned with the figures described above; however, the model is not limited to the above-mentioned examples, and variations based on the technology of this model are possible.

In particular, it should be recognized that fewer than three filters and channels could be employed, down to a minimum of one, and four filters could be employed, one in each corner of the cartridge.

The design is applicable to disk cartridges for various types of disks other than SSR disks.

As mentioned above, air current induced by high speed disk rotation in the cartridge is directed into air filters, and dust in the air current is effectively removed by the air filter in the disk cartridge. Therefore, dropouts and head and disk damage caused by dust trapped between the head and disk can be prevented, and improvements in recording/playback and the life of the head and disk can be obtained.

Also, the ribs on the inner surface of the cartridge increase the rigidity of the cartridge, and therefore, compatibility and reliability of the cartridge for disk players is increased.

When airflow in the cartridge is turbulent, oscillations tend to form in the floating head and it beats on the recording surface which becomes uneven and results in off-track recording. However, in the case of the disk cartridge of this model, the air current is rectified by directing the air current with ribs, and therefore, oscillation of the head can be prevented. A uniform heat distribution on the recording surface can also be obtained.

We claim:

1. A generally square disk cartridge adapted to contain a circular recording/playback disk in such a way that the disk is free to rotate, comprising:
   at least one air filter disposed beyond the outer circumference of the said disk and within a corner of said cartridge; and
   at least one circular rib adjacent said outer circumference of said disk and between said disk and said filter which induces air flow generated by rotation of said disk to said air filter.

2. A disk cartridge according to claim 1 further including at least one radial rib extending outwardly from substantially the center of said cartridge to connect with said circular rib at its end first encountered in the direction of rotation of said disk.

3. A disk cartridge according to claim 2 wherein said circular and said radial rib form a smooth curve which is convex with respect to the direction of rotation of said disk.

4. A disk cartridge according to claim 2 wherein said radial rib comprises two portions, one disposed between each side of said disk and said cartridge.

5. A disk cartridge according to claim 2 including three filters disposed one in three corners of said cartridge, three circular ribs each disposed adjacent said disk and between said disk and one of said filters with a separation between each of said circular ribs, and three radial ribs each extending from substantially the center of said cartridge to connect one with each of said circular ribs at their ends first encountered in the direction of rotation of said disk.

6. A disk cartridge according to claim 5 wherein said circular rib and their associated radial ribs form smooth curves which are convex with respect to the direction of rotation of said disk.

* * * * *